June 6, 1933.  D. B. FOUST  1,912,441
ELECTRIC MOTOR
Filed Aug. 12, 1931  6 Sheets-Sheet 4

INVENTOR
Donald B. Foust
BY his ATTORNEYS.

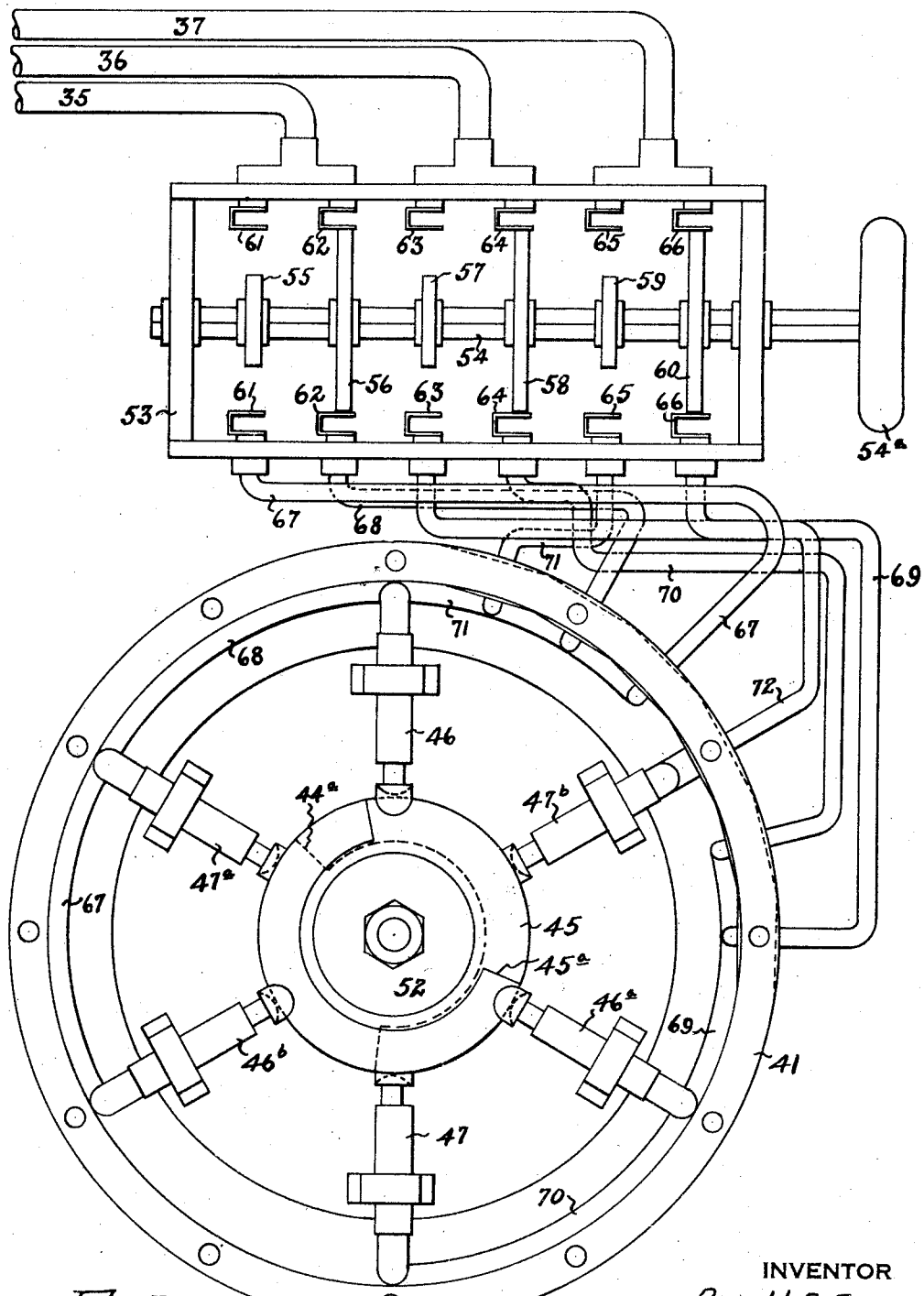

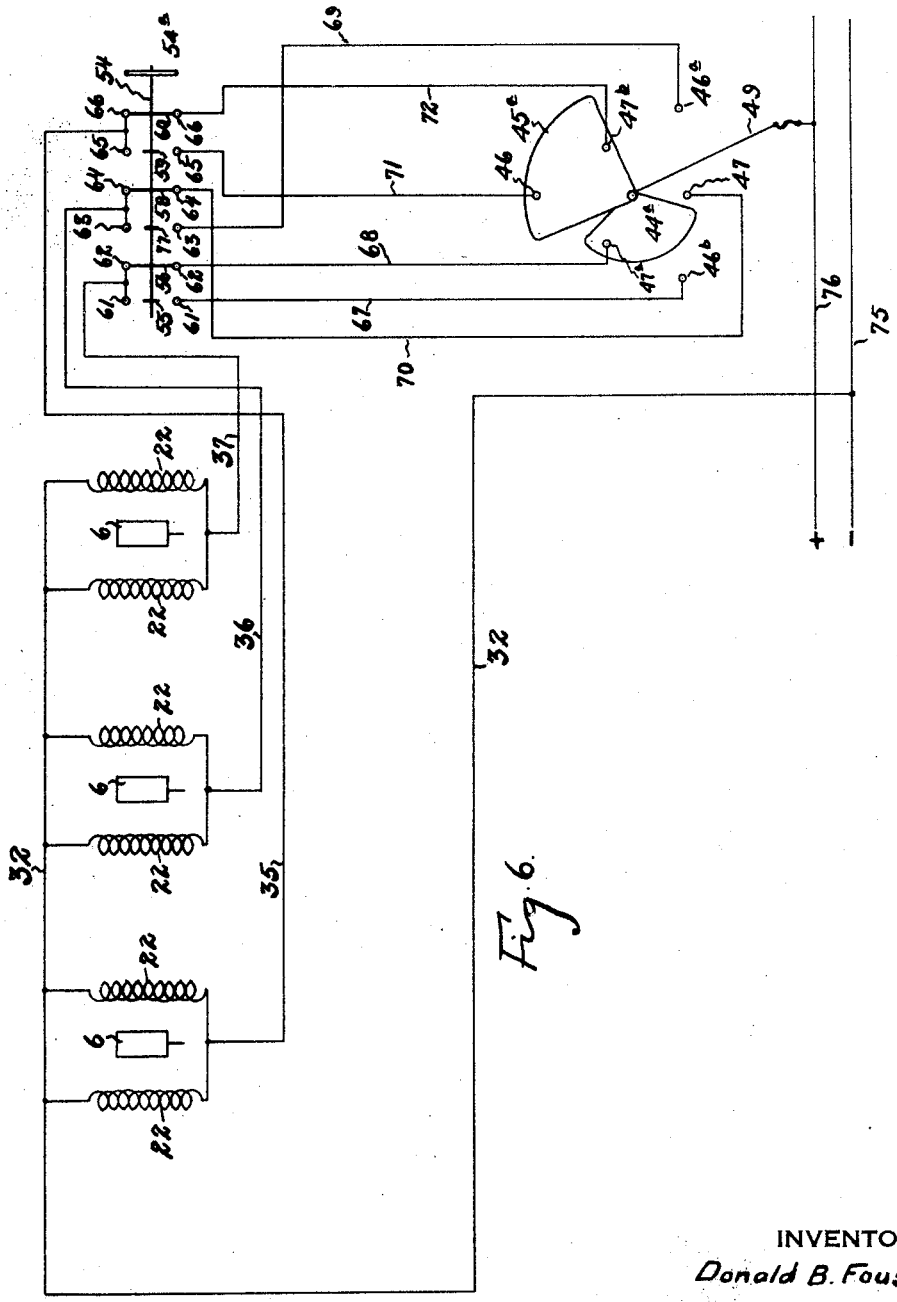

Patented June 6, 1933

1,912,441

UNITED STATES PATENT OFFICE

DONALD B. FOUST, OF EASTON, PENNSYLVANIA

ELECTRIC MOTOR

Application filed August 12, 1931. Serial No. 556,474.

This invention relates in general to improvements in electric motors.

One of the objects of this invention is the provision of a novel type of electric motor constructed along the lines of an internal combustion engine.

Another object of this invention is the provision of a motor structure employing a plurality of pistons connected to a crank shaft and an electromagnetic field within which the pistons operate.

A still further object of this invention is the provision of means for controlling the strength of the electromagnetic field.

Another object of this invention involves a solenoid field construction in which the field windings are mounted so as to be movable toward and away from the piston plunger.

A further object of this invention involves in combination with the motor a commutator mechanism and switching mechanism.

These and many other objects as will appear from the following disclosure are secured by means of this invention.

This invention resides substantially in the combination, construction, arrangement and relative location of parts all as will be set forth in greater detail below.

Referring to the drawings—

Figure 1 is a vertical cross-sectional view through one of the cylinders showing the crank shaft and connecting links for all the cylinders;

Figs. 2 and 3 taken together are diagrammatic top plan views of the device of this invention;

Fig. 5 is an enlarged detail view of the commutating mechanism and the reversing switch;

Fig. 6 represents the circuit connections.

Figure 1:
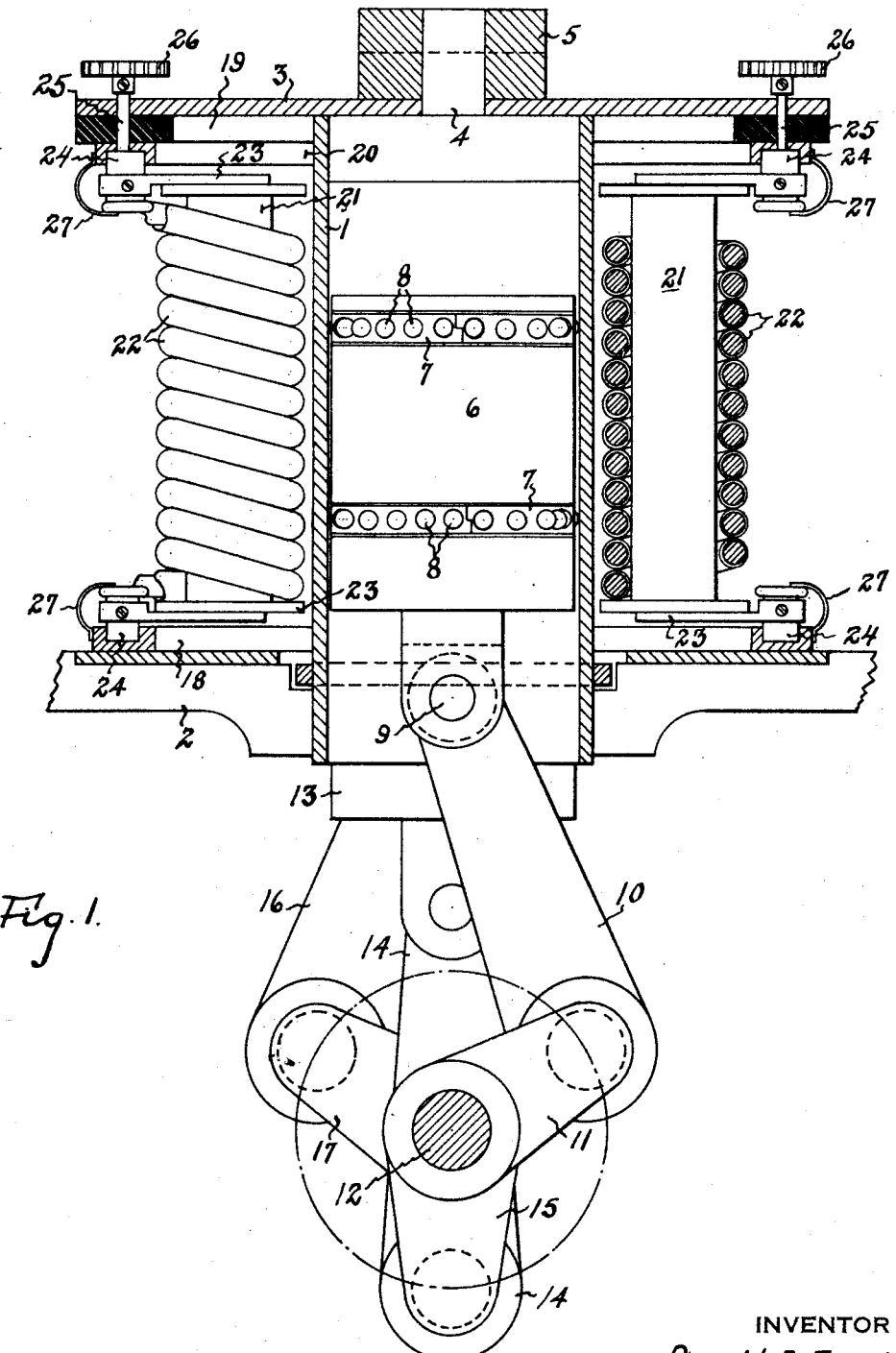

In general this invention involves an electric motor having solenoid fields in which piston plungers operate. These piston plungers are connected to a crank shaft and from which the power is taken. A commutating mechanism is provided and operated by the main crank shaft for energizing the field coils in the proper sequence. A novel arrangement is provided for varying the field strength. All these features will be best appreciated by reference to the drawings.

Each cylinder is substantially the same and is shown as comprising a cylindrical member 1 of a suitable material such as metal or an insulating material but preferably not a magnetic material. These cylinders are mounted upon a supporting frame 2 forming part of an enclosing casing. At the upper end each cylinder supports a plate 3 having a central vertically extending lug 4 which seats in a longitudinally extending bar 5 by means of which the parts are held in alignment. Within each cylinder is a piston 6 of magnetic material provided with several piston rings in which are mounted anti-fraction members 8. Each piston is pivotally connected as indicated at 9 to a link 10 which connects with a crank 11 formed on the crank shaft 12. The next piston 13 is connected by the connecting link 14 to the crank 15 and the third cylinder is connected by the connecting link 16 to the crank 17. In the case of the third cylinder motor as set forth in the drawings the cranks 11, 15 and 17 are set at 120 degrees with respect to each other in accordance with well known practice.

Figure 2:
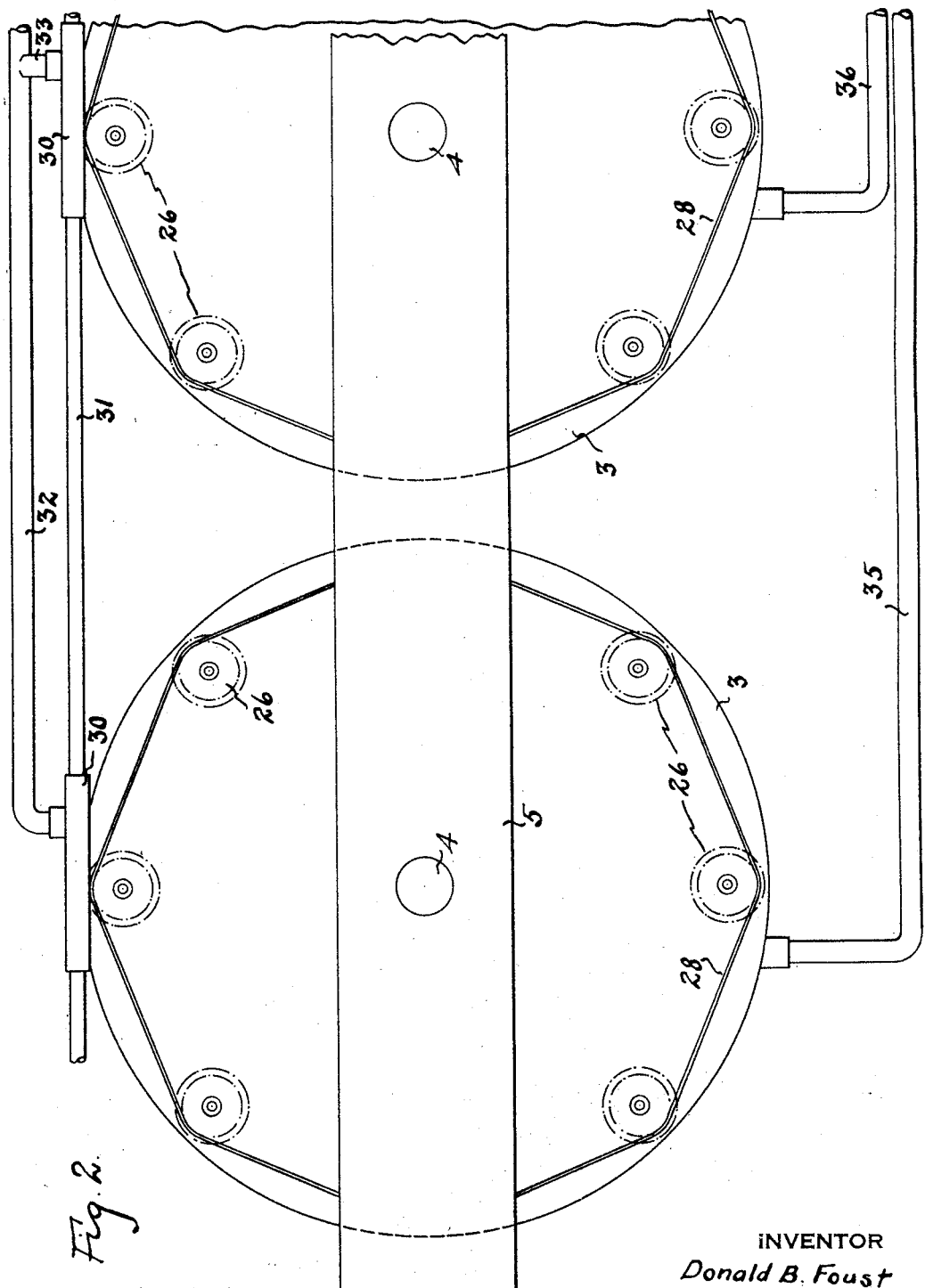
Figure 3:
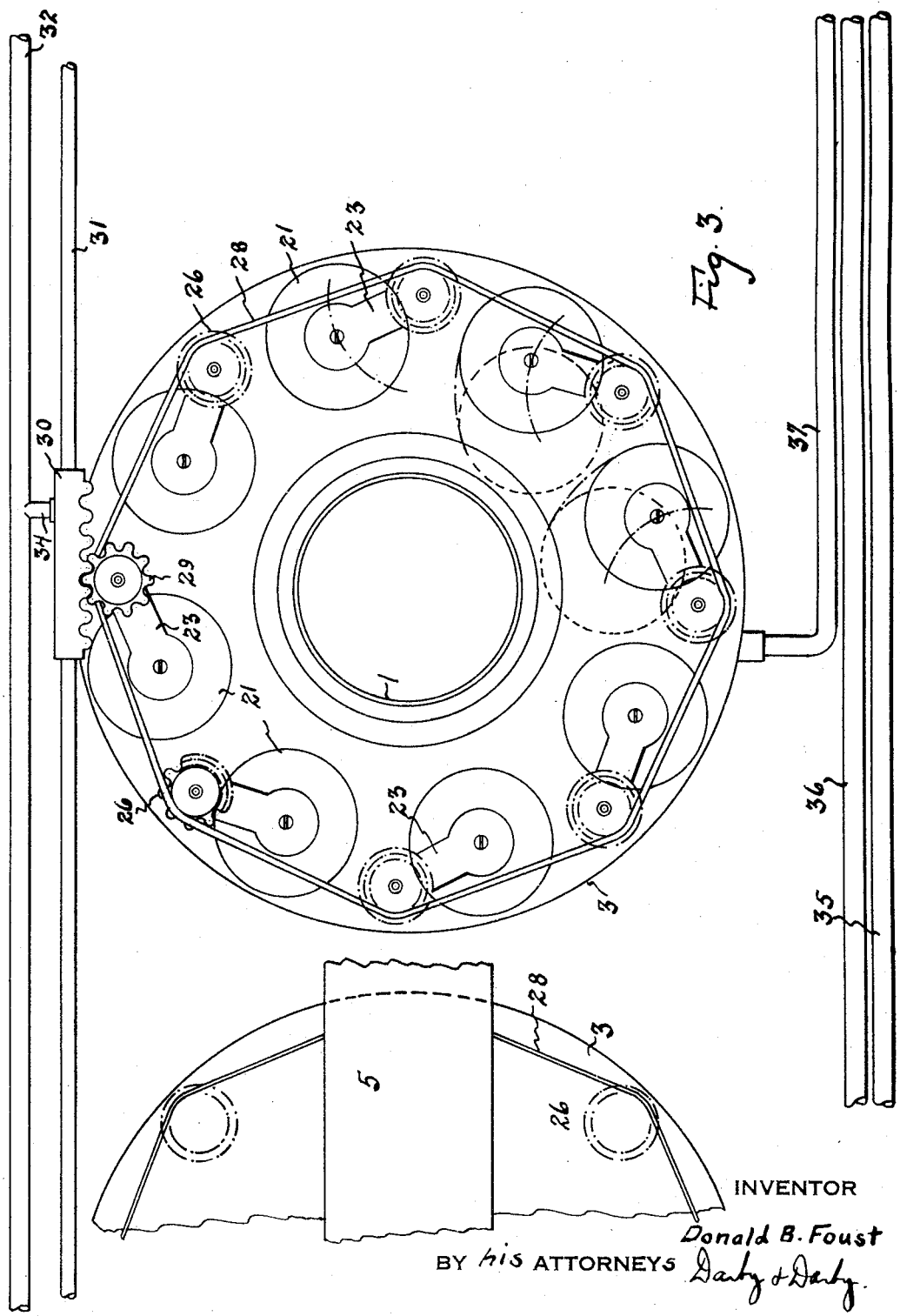
Figure 4:
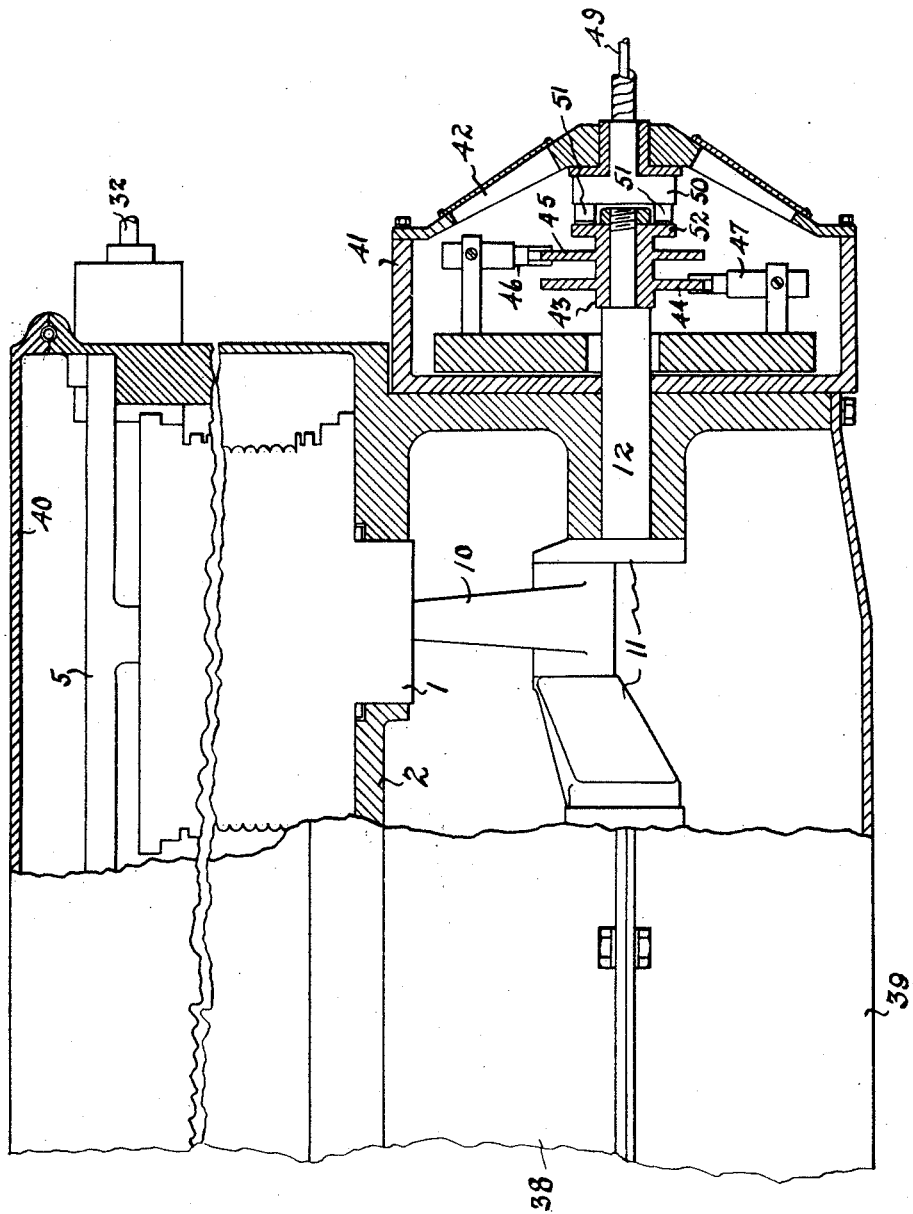
Figure 4 is an enlarged elevational view partly in cross-section showing the association of the motor and the commutating mechanism.

At 18 is a copper conducting ring near the lower end of the cylinder and mounted on the plate 3 near the upper end of the cylinder is the insulating ring 19 and the copper conducting ring 20 mounted thereon. Arranged around the cylinder are a plurality of iron cores 21 upon which are wound a number of insulated turns of conducting material such as copper as indicated at 22. The iron cores 21 are mounted upon supporting arms 23 at each end, which arms are pivotally supported as indicated at 24 in the rings 18 and 20. The upper arms 23 are provided with short stud shafts 25 which project through the upper plate 3 and are provided on their ends with spur gears 26. The ends of the windings are electrically connected respectively to the conducting rings 18 and 20 by means of pigtails 27. As indicated in Figs. 2 and 3 a number of these cores and windings are swivelly mounted around the cylinder and the spur gears 26 are encircled by means of an endless chain 28. One of the spindles 25 of each cylinder as indicated in Fig. 3 is provided with a second gear mounted above the gear 26 as shown at 29. These gears 29 mesh with the teeth of racks 30 secured to a longitudinally extending rod 31. The upper ring 20 of each cylinder is connected to a conductor 32 as indicated at 33 and 34. The lower rings of the cylinders are individually connected to conductors 35, 36 and 37. As shown in Fig. 4 all the parts are enclosed within a casing which is formed by the two parts 38 and 39 and a cover 40.

The crank shaft extends out of one end of the casing and is provided with a drive gear or similar driving connection (not shown) in accordance with well known practice. Secured to the other end of the casing is a similar casing 41 provided with a cover having closed openings 42 for access thereinto. The drive shaft 12 projects into this similar casing and has secured at the reduced end thereof a commutator comprising a hub 43 and annular integral rings 44 and 45. Mounted on these rings as indicated in Fig. 5 are the conducting segments 44ª and 45ª. A series of brush holders and brushes 46, 46ª and 46ᵇ, and 47, 47ª and 47ᵇ are provided. These brush holders are mounted within the casing 41 and arranged so that each set bears upon one of the rings 44 and 45. The end of hub 43 is provided with a continuous contact plate 52 which is engaged by means of brushes 51 mounted on a support 50 which is insulated from the casing and to which the conductor 49 is electrically connected. In Fig. 5 there is shown the reversing switch comprising a casing or frame 53 in which a shaft 54 provided with an operating handle 54ª is journaled. Mounted upon this shaft and insulated therefrom are the switch plates 55, 56, 57, 58, 59 and 60. Mounted upon one side of the frame 53 are a set of contact fingers 61, 62, 63, 64, 65 and 66. Likewise there is mounted upon the other side of the frame 53 a similar set of contact fingers. The upper set of contact fingers are connected to the conductors 35, 36 and 37 as shown, in pairs. The lower contact 61 is connected by a wire 67 to brush 46ᵇ. The lower contact finger 62 is connected by wire 68 to brush 47ª. The lower contact finger 63 is connected by wires 69 to brush 46ª. Lower contact 64 is connected by conductor 70 to brush 47. Lower contact 65 is connected by a conductor 71 to brush 46. Lower contact 66 is connected by conductor 72 to brush 47ᵇ.

The circuit connections for the device are shown in Fig. 6 wherein the various parts are shown diagrammatically and given the same reference numerals. The wires 75 and 76 represent the feed conductor wires leading from the current source which is a direct current source.

With the parts in the position shown in Fig. 6 current flows from wire 76 (+) through wire 49, commutator segment 44ª, brush 47ª, wire 68, contact 62, switch blade 56, contact 62, wire 37, to the left hand field windings 22 in parallel, through 32 to wire 75 (−). In this position of parts the two remaining sets of windings at this point in the cycle of the apparatus are de-energized, with segment 44ª about to make contact with brush 47 which will energize the middle set of windings. Commutator segment 44ª is for forward motion, commutator segment 45ª is for reverse motion. The commutator is so arranged that as each piston reaches the upper end of its stroke the field winding for that piston is de-energized. It is not again energized until it reaches the lower end of its stroke and is ready to begin its return movement. The reversing switch is connected in so that the timing of the commutator may be charged to effect the operation of the motor in either direction of rotation.

The strength of the field in which the pistons operate may be varied by swinging the field windings 22 on their cores 21 nearer to and further away from the piston plunger. This is, obviously, accomplished with the construction disclosed by pushing and pulling upon the rod 31. As this rod moves back and forth longitudinally the rungs mounted thereon cause the windings to pivot about the shafts 25 so that the field coils may be moved nearer to or further away from the piston plungers as desired, producing acceleration.

From the above disclosure it will be apparent that this invention resides in certain principles of construction and operation which may be embodied in other physical forms and I do not desire to be strictly limited to the disclosure which is given for purposes of illustration but rather to the scope of the appended claims.

What I seek to secure by United States Letters Patent is:

1. In an electric motor the combination comprising a reciprocal plunger, a crank shaft connected to the plunger, means for forming a magnetic field of force around the piston plunger, and means for moving the field forming means with respect to the piston plunger.

2. An electric motor of the type described, the combination comprising a reciprocally mounted plunger, a crank shaft connected to the plunger, a plurality of electro-magnetic windings arranged around the plunger, and means for simultaneously moving all of the electromagnetic windings with respect to the plunger.

3. An electric motor of the type described, comprising a reciprocally mounted piston, a crank shaft connected to the piston, a plurality of solenoid windings, means for pivotally mounting the windings around the piston, and means for simultaneously swinging all of the windings on their pivots.

4. An electric motor of the type described, comprising a piston mounted for reciprocation, a crank shaft connected to the piston, a plurality of electromagnetic windings mounted for oscillation about an axis parallel to the path of movement of the piston, and means for simultaneously moving the windings.

5. An electric motor of the type described, comprising a cylinder, a piston within the cylinder, a crank shaft connected to the piston and a plurality of field windings supported around the cylinder to form conjointly a solenoid, and means for varying the position of all of the windings with respect to the cylinder and piston.

6. An electric motor of the type described, comprising a cylinder, piston and crank shaft, a plurality of windings arranged around the cylinder and piston and pivotally mounted, means for simultaneously imparting pivotal movement to all of the windings, and means for supplying current to the windings in parallel.

7. An electric motor of the type described, comprising a plurality of pistons mounted for reciprocation, a crank shaft connected to all of the pistons, a plurality of field windings pivotally mounted adjacent the pistons, means for simultaneously pivoting all of the windings and commutating means for energizing the windings in sequence.

8. An electric motor of the type described, comprising a plurality of pistons mounted for reciprocation, a crank shaft connected to all of the pistons, a plurality of field windings pivotally mounted adjacent the piston, means for simultaneously pivoting all of the windings and commutating means for energizing the windings in sequence, said commutator means being operatively connected to the crank shaft.

9. An electric motor of the type described, comprising a plurality of cylinders and pistons, a crank shaft connected to all the pistons, a set of field windings mounted around each cylinder, means for simultaneously moving all of the field windings towards and away from the cylinder, and means for supplying current to each set of windings in sequence.

10. An electric motor of the type described, comprising a plurality of cylinders and pistons, a crank shaft connected to all the pistons, a set of field windings mounted around each cylinder, means for simultaneously moving all of the field windings towards and away from the cylinder, a commutator driven by the crank shaft, and connections between the windings and the commutator for energizing each set of windings in sequence.

11. An electric motor of the type described, comprising a plurality of cylinders and pistons, a crank shaft connected to all the pistons, a set of field windings mounted around each cylinder, means for simultaneously moving all of the field windings towards and away from the cylinder, a commutator driven by the crank shaft, and connections between the windings and the commutator for energizing each set of windings in sequence, said connections including a reversing switch.

12. An electric motor of the type described, comprising at least one reciprocal piston, a crank shaft connected to the piston, a plurality of iron cores arranged around the piston, means for pivotally supporting the cores, means for operating all of said means simultaneously whereby the cores may be moved towards and away from the pistons, and a winding on each of said cores.

13. An electric motor of the type described, comprising at least one reciprocal piston, a crank shaft connected to the piston, a plurality of iron cores arranged around the piston, means for pivotally supporting the cores, means for operating all of said means simultaneously whereby the cores may be moved towards and away from the pistons, a winding on each of said cores, and means for supplying current to the windings in parallel.

In testimony whereof I have hereunto set my hand on this tenth day of July, A. D., 1931.

DONALD B. FOUST.